(12) United States Patent
 Eskilsson (10) Patent No.: US 8,976,219 B2
(45) Date of Patent: Mar. 10, 2015

(54) STUDIO AND CONFERENCE SYSTEM FOR LIFE-SIZE VIDEOCONFERENCING

(75) Inventor: Erik Eskilsson, Solna (SE)

(73) Assignee: Mebe Viewcom AB, Solna (SE)

( * ) Notice: Subject to any disclaimer, the term of this patent is extended or adjusted under 35 U.S.C. 154(b) by 275 days.

(21) Appl. No.: 13/701,606

(22) PCT Filed: Jan. 21, 2011

(86) PCT No.: PCT/SE2011/050064
§ 371 (c)(1),
(2), (4) Date: Feb. 25, 2013

(87) PCT Pub. No.: WO2011/152771
PCT Pub. Date: Dec. 8, 2011

(65) Prior Publication Data
US 2013/0162749 A1      Jun. 27, 2013

(30) Foreign Application Priority Data
Jun. 3, 2010   (SE) ..................... 1000603

(51) Int. Cl.
*H04N 7/14*      (2006.01)
*H04N 7/15*      (2006.01)
*H04M 3/56*      (2006.01)

(52) U.S. Cl.
CPC .............. *H04N 7/15* (2013.01); *H04N 7/144* (2013.01); *H04M 3/567* (2013.01)
USPC ...................... 348/14.07; 348/14.1

(58) Field of Classification Search
CPC ......... H04N 7/15; H04N 7/147; H04N 7/141; H04N 7/152; H04N 7/142; H04M 3/56; H04M 3/563; H04M 3/565
USPC ...................... 348/14.01, 14.07, 14.08, 14.16
See application file for complete search history.

(56) References Cited

U.S. PATENT DOCUMENTS

| 6,882,358 B1 | 4/2005 | Schuster et al. |
| 2004/0165060 A1 | 8/2004 | McNelley et al. |

(Continued)

FOREIGN PATENT DOCUMENTS

| WO | 2004091214 A1 | 10/2004 |
| WO | 2008036931 A2 | 3/2008 |
| WO | 2009120814 A2 | 10/2009 |

OTHER PUBLICATIONS

International Search Report, corresponding to PCT/SE2011/050064, date of completion Dec. 12, 2011.

(Continued)

*Primary Examiner* — Quoc D Tran
(74) *Attorney, Agent, or Firm* — Renner, Otto, Boisselle & Sklar, LLP (57) ABSTRACT

Studio, studio system, studio configuration and calibration method for life-size videoconferencing include local conferee space and local transceiver for life-size videoconferencing. The transceiver includes optical input unit and optical output unit providing continuous duplex image transfer via a duplexer area of a screen configured to simultaneously transmit to local conferee space the image of remote conferee space including a remote studio, and reflect the image of local conferee space to the optical input unit, enabling visualizing to scale without aberrations image of the entire local conferee space to the remote conferee space; enabling a local party conferee to establish eye contact and register body movements of a remote party conferee. Images of physically separated conferee spaces are concatenated to an operational conference setting, enabling a remote conferee located anywhere in the remote space to establish eye contact with a conferee visible in the image of the second remote space.

11 Claims, 7 Drawing Sheets

(56) References Cited

U.S. PATENT DOCUMENTS

| | | |
|---|---|---|
| 2005/0024484 A1* | 2/2005 | Leonard et al. ............ 348/14.01 |
| 2005/0237381 A1 | 10/2005 | White |
| 2006/0244817 A1* | 11/2006 | Harville et al. ............ 348/14.08 |
| 2008/0013050 A1 | 1/2008 | Boute et al. |
| 2011/0025819 A1* | 2/2011 | Gorzynski et al. ......... 348/14.07 |
| 2011/0102539 A1* | 5/2011 | Ferren ........................ 348/14.08 |
| 2013/0155174 A1* | 6/2013 | Ferren et al. ............... 348/14.03 |

OTHER PUBLICATIONS

International Preliminary Report on Patentability, corresponding to PCT/SE2011/050064, date of completion of report May 9, 2012.

* cited by examiner

STUDIO AND CONFERENCE SYSTEM FOR LIFE-SIZE VIDEOCONFERENCING

TECHNICAL FIELD

The present invention relates to improved communication through a life-size videoconferencing system.

BACKGROUND

Desk modules where a screen skewed around a horizontal axis is placed in line of sight between a persons face and a display, and where the image of the face reflected by the screen is picked up by a camera placed above or below the screen is known in prior art.

US2004/0165060 (McNelley et al.) rejects this line-up principle and argues that increased bulk of the terminal is a drawback, that the addition of a transparent barrier in front of the display will affect viewing of the display surface, that the appearance of the display is recessed far into the terminal creating a tunnel effect and, lastly, that "the awkward positioning of the camera" will intrudes into the conferee's work space. Instead McNelley et al. discloses camera in a room environment, positioned behind a beam-splitter to capture the conferee's image through the beam-splitter. The beam-splitter is used for capturing images from one direction, and for allowing the conferee to see the environment through the beam-splitter. The document suggests the option to create the appearance of an image of a remote conferee and the local conferee in the same local environment on each side of a desk. In effect, the beam-splitter does not transmit anything beyond the top of a remote conferee.

The camera is positioned behind the viewing side of the beam-splitter to capture the conferee's image through the beam-splitter. The some 150 various embodiments of the terminal are illustrated in an equal amount of figures. Common for all the illustrated terminals is that in practice, they allow for transmission of the image of a conferee's face only. FIG. 60 illustrates three conferees' heads crowding up in line, watching an image of three lined up heads shrunk to fit the display, a set-up with obvious drawbacks. McNelley therefore suggests an alternative way to accommodate multiple users; a set of terminals are essentially coupled in parallel, i.e. multiple cameras, or a single camera is mounted on a turntable. Computers are used to attempt to emulate eye-to-eye contact. These embodiments require the use of image blocking film to prevent the conferees from seeing the display directly. The film reduces the image intensity. The end-user experience is that of dispersed obscure ghostlike talking heads, not to mention the time-sharing problem associated with the turntable solution.

US2005/0237381 A1, McDuffie, discloses a device in which a backdrop surface is superimposed upon the image of the remote person, as a way to mitigate the ghostlike appearance.

In U.S. Pat. No. 6,882,358 Schuster et al., identifies a problem as follows: "the video images of the conference participants make it appear as if the participants are gazing off into space, rather than looking directly at each other. Thus, although the participants may see each other at times, they cannot achieve eye-to-eye contact. This problem is exacerbated by today's larger video monitors and projection screens, since this forces the angle between the camera direction and the conference participants' focal direction to be increased. This lack of eye contact is a significant drawback, which limits the usefulness of today's video conferencing equipment in providing a natural conversation. Furthermore, without eye-to-eye contact, the trustworthiness of meeting participants is difficult to judge." Schuster proposes a solution that relies on the premise of physically or virtually locating the camera such that its field of view (FOV) originates behind the display and passes through the central portion of the video display. The conference participants are presumed to look toward the center of the display, in which case their eyes will be directed toward the physical or virtual camera location, rather than away from it, thus enabling a feel of eye-to-eye contact between the participants. Unfortunately, this has an unwanted and highly detrimental side effect of creating a false eye contact impression. If one participant has "eye-contact" with a person on the other side, then by definition all participants have "eye-contact" with that same person.

WO 2008/036931 McDuffie discloses a desk module with backdrop similar to desk modules disclosed in US2005/0237381 A1, McDuffie, U.S. Pat. No. 6,882,358 Schuster and US2004/0165060 McNelley. WO 2009/120814 discloses an alternative desk module setup and a FIG. 1a, in which a participant to the extreme left or right is obviously not gazing directly toward any comprised camera 110C when looking at the respective screen 120L or 120R closest to the participant. Therefore, clearly, neither true nor false "eye-contact" may be obtained through this system. Neither of the documents discloses a communication system for communication between two studios of the same type.

Eye contact is a considerable component of the non-verbal communication in a common dialogue. If the implicit rules are not conformed to irritation occurs.

Therefore it is highly detrimental to the quality of a meeting when true eye contact cannot be reproduced in a video conversation. And even more so as gestures and body language is not transmitted at all. For instance the disregarded but absolutely vital process of taking turns during a conversation or a negotiation requires that all participants have access to accurate eye movement and full body language of all the other participants.

Existing technology does not deliver this, and under such circumstances people feel cheated, and as a result they become frustrated. (Hutchby, I. (2001) Conversation and Technology: From the Telephone to the Internet (Cambridge: Polity). Frustrated meeting participants is a definite showstopper for any high end conference tool.

Therefore executive officers, members of the diplomatic corps etc. still travel long distances to participate in different kinds of meetings, despite physical inconvenience, carbon dioxide emissions, security issues such as volcano eruptions and terrorism, and high cost. It is just not humanly possible to perform sensitive negotiations without full access to eye contact and body language. This is a need that obviously has not been met, despite assiduous attempts.

SUMMARY

It is an objective to remove the impediments of teleconferencing as described above, so that every conferee has full access to accurate eye contact and body language of every other conferee simultaneously. It is also an objective to eliminate the "false eye-contact phenomenon" that known solutions are marred with. It is also an object to enable video conferencing such that every object or conferee appears to be solid and in relative life-size, i.e. where the experienced object size is relative to the apparent distance to the beholder regardless of physical distance. To date, these two objectives have been attempted but never satisfactorily fulfilled.

Further it is an object to enable the realistic impression of conferees in different physical locations participating in the same operational conference setting, so that every conferee experiences the apparent presence of every other conferee. This object includes enabling remote conferees to clearly see not only the local conferees, but also local objects in the periphery of the local studio.

It is also an objective to enable easy and quick standardized commissioning of studios, including mounting and assembly of components, and configuration and calibration in order to enable a standardized system of studios, that is tampering resistant, and also easy to restore to full functioning.

A first aspect of the invention is a local studio for life-size videoconferencing. The studio comprises a local conferee space and a local transceiver for life-size videoconferencing, the transceiver comprises an optical input unit and an optical output unit adapted and configured to provide continuous duplex image transfer via a duplexer area of a screen. The duplex area is adapted and configured to simultaneously transmit, that is enable light to pass through, to the local conferee space the image of a remote conferee space comprised in a remote studio, visualized to scale without aberrations, displayed on the output unit; and adapted and configured to reflect the image of the local conferee space to the optical input unit, enabling the image of the entire local conferee space to be visualized to scale, without aberrations, to the remote conferee space; thereby enabling a local party comprising a conferee to establish eye contact and register the body movements of a remote party comprising conferee.

The image may be a still image or a moving image, i.e. light flux with prolongation in time, which can serve as a basis for video recordings.

The screen of the transceiver may be skewed with an angle α around a vertical axis z.

The screen may further be skewed with an angle α such that the duplex area width x as seen from the local conferee space is wider than the duplex area width y as seen from the input unit.

A mirror may be comprised in the transceiver at least partly facing the reflective side of the screen, and arranged to reflect the image from the screen to the input unit via the mirror in such a way that the optical distance between the local conferee space and the input unit is extended.

The duplexer area comprises the portion of the screen which is in field of view of the optical input unit and through which the optical output unit may be visible from the conferee space. The screen size may correspond to the screen size, but in preferred embodiments the screen is considerably larger, so that the screen fringe may not cause aberrations in the view.

The transceiver may comprise a transparent protective barrier. The barrier protects the components of the transceiver from tampering from the outside. The barrier also seals the transceiver from draft or changes in air pressure that would otherwise make the thin screen bulge, and hence cause aberrations.

The conferee space comprises only points of said space being in the field of view of the optical input unit.

The conferee space may be a designated conferee space confined to a space above a slightly elevated platform.

The studio may further comprise a second local transceiver to a second remote studio; this second transceiver enables the image of the entire local conferee space to be visualized to scale, without aberrations, to a second remote conferee space. The second remote conferee space then may become operationally concatenated via a second duplexer area to the conference setting, thereby enabling a local conferee within the conference setting to establish eye contact and register the body movements of a remote conferee within the same conference setting, regardless of the remote conferees' physical location.

The first local transceiver may be placed so that its duplexer area is facing the duplexer area of the second local transceiver in such a way that a first conferee within the conference setting may establish eye contact and register the body movements of a second conferee within the same conference setting, regardless of the first and second conferees' physical location.

A second aspect is a remote studio for life-size videoconferencing comprising a remote conferee space and a remote transceiver for life-size videoconferencing, the transceiver comprising an optical output unit adapted and configured to provide continuous duplex image transfer via a duplexer area of a screen, the area adapted and configured to simultaneously transmit to the remote conferee space the image of a local conferee space comprised in a local studio, visualized to scale without aberrations, displayed on the output unit; and adapted and configured to reflect the image of the remote conferee space to the optical input unit, enabling the image of the entire remote conferee space to be visualized to scale, without aberrations, to the local conferee space; thereby enabling a remote party comprising a conferee to establish eye contact and register the body movements of a local party comprising a conferee.

The remote studio may be adapted and configured to render the image of the local conferee space that comprises an image of a second remote conferee space, thus enabling the images; and the remote conferee space to be concatenated to an operational conference setting, thereby enabling a remote conferee located anywhere in the remote space to establish eye contact with a conferee visible in the image of the second remote space.

A third aspect is a studio calibration method for calibration of a studio enabling transmission of accurately calibrated conference information. The method comprises the steps:

displaying a reference calibration image featuring a standardized studio on an output unit comprised in the transceiver of a local studio, the image featuring a conferee space, as seen by a perfectly configured input unit, the calibration image comprising a set of reference points;

receiving an image captured by an input unit of the studio to be calibrated;

feeding the image of the studio to be calibrated as seen by the input unit to a local output unit, in such a way that the two images and thereby their respective sets of reference points are superimposed; and manipulating the input unit of the studio to be calibrated such that there is a perfect agreement between the two sets of reference points, enabling perfect agreement between the two superimposed images.

The receiving step may be performed with an input unit comprised in the local studio.

A networking unit comprised in the local studio may be receiving an image over a network, the image being captured by a remote input unit in a remote studio to be calibrated. The manipulating step may comprise the further step Transmitting over the network control signals from the local studio to the studio to be calibrated, the control signals being a function of the lack of agreement between the two sets of reference points.

The manipulating step may comprise altering the input unit angle. The manipulating step may comprise altering the input unit focal distance.

A fourth aspect of the invention is a configuration and calibration method performed at commissioning of a studio, enabling transmission of accurately calibrated conference information to a remote studio and accurate rendering of received conference information from the remote studio. The method comprises the steps:

measuring and adapting the studio so that the inner dimensions comply with standardized dimensions in terms of width, depth and height, assembling a transceiver so that aspects and relative distances comply to a standardized design, within the transceiver as well as relative the studio interior;

displaying a configuration image on the output unit;

adjusting the output unit so that the configuration image assumes a standardized aspect ratio and size;

permanently fixing all components of the transceiver in their standardized positions directly or indirectly to the studio using non resilient fixtures, and performing the method according to the third aspect.

The assembling may comprise the further steps

Arranging an output unit by the short side of the studio, so that it's rendering surface faces the conferee space.

Skewing a screen with an angle α around a vertical axis z in front of the rendering surface.

Arranging an input unit relative the screen so that the screen may reflect an image of the local conferee space to the input unit;

Arranging a transparent protection barrier as the transceiver front wall parallel to the rendering surface.

The method according to the fourth aspect may further comprise arranging a mirror so that the image from the screen is reflected to the input unit via the mirror thereby extending the optical distance between the local conferee space and the input unit.

The measuring and adapting step may comprise the further step constructing a platform so placed in the studio that any point in space between the platform and a surface of equal shape vertically translated a standardized distance is in line of sight from the input unit and from the display.

The adjusting step may further comprise manipulating the distance and relation between an image forming unit and an image rendering surface comprised in the output unit.

A fifth aspect is a conference setting system comprising a first studio and a second studio. A telecommunication system is connectable to each studio enabling real-time transmission of conference information comprising still and moving images and sound, such as video signals. The studios may be calibrated such that an image of a first conferee space is transmitted and visualized to scale without aberrations to a second conferee space, and such that an image of a second conferee space is transmitted and visualized to scale without aberrations to a first conferee space; the conferee spaces; operationally concatenated via transceiver duplexer areas, audio systems and lighting systems to a single conference setting, thereby enabling a conferee within the conference setting to establish eye contact, register the body movements, listen and speak to a remote conferee within the same conference setting.

All studios comprised in the conference setting system (100, 200, 300) are identical, i.e. all features that are operationally important to obtain duplex transmission between a local and a remote studio are mutually identical.

BRIEF DESCRIPTION OF THE DRAWINGS

In order to explain the invention in more detail an embodiment of the present invention will be described in detail below, reference being made to the accompanying drawings, in which.

DETAILED DESCRIPTION

In the corporate world dedicated conference rooms are necessary and therefore commonplace. The high value of a comfortable and well functioning conference setting is appreciated, and these premises are relatively spacious and always well-equipped both in terms of service, technology and design. A corporate conference room serves as an interface toward clients and customers. Video conferencing may be set up with an external party, but more importantly, the external party may be participating on site. Therefore it is important to be able to convey the "look and feel" of the corporate identity regardless of whether the external party is talking to a corporate officer on site or a corporate officer at a remote site. Despite this fact, previous attempts to create teleconferencing systems fail to exploit the advantages of being able to realistically render the remote environment along with the remote conferee, this even though some solutions actually do acknowledge the advantage of the remote conferees appearing in a standardized setting. McDuffie et al. projected a fake backdrop onto the received image of the remote conferee.

It is an objective to remove the impediments of teleconferencing as described above, so that every conferee has full access to accurate eye contact and body language of every other conferee simultaneously. It is also an objective to eliminate the "false eye-contact phenomenon" that known solutions are marred with. It is also an object to enable video conferencing such that every object or conferee appears to be solid and in relative life-size, i.e. where the experienced object size is relative to the apparent distance to the beholder regardless of physical distance. To date, these two objectives have been attempted but never satisfactorily fulfilled.

Figure 1:
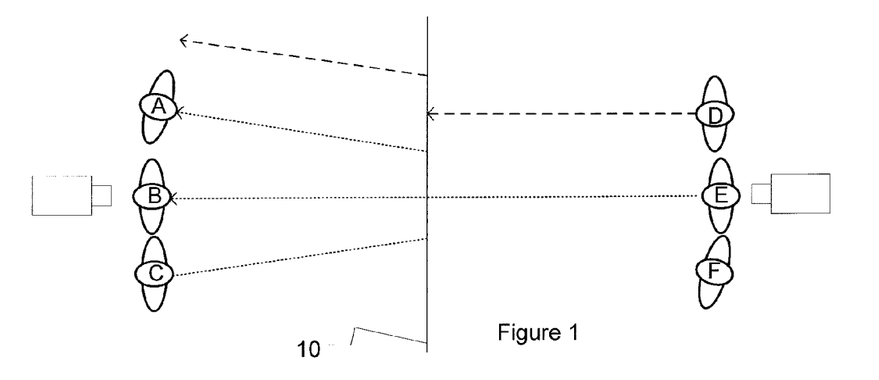
FIG. 1 is a top view over actual and apparent direction of view.

This is instrumental in order to eliminate the irritation and frustration that Hutchby has previously identified, an elimination that to date has not been acknowledged as significant, despite Hutchby's findings. FIG. 1 illustrates the false eye-contact phenomenon. Conferees A, B, and C on the left hand side are in videoconference with conferees D, E and F on the right hand side. Each side has a display surface along the interface 10. Behind each display is a camera. When conferee D watches conferee A on the display, conferee D appears to be watching something to the left of A. Further if E, or for that matter D or F, looks at B, i.e. straight towards the camera, everybody on he left hand side will perceive E as looking straight at him or her personally. If E then asks a question, A, B and C will try to answer all at once.

Further it is an object to enable the realistic impression of conferees in different physical locations participating in the same operational conference setting, so that every conferee experiences the apparent presence of every other conferee. This object includes enabling remote conferees to clearly see not only the local conferees, but also local objects in the periphery of the local studio.

Figure 2A:
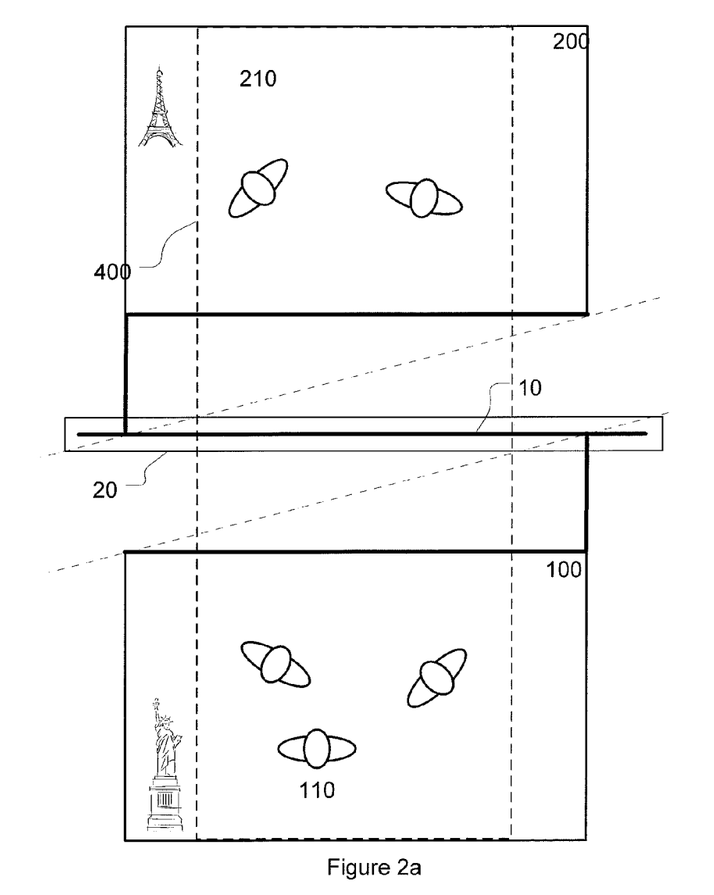
FIG. 2 is a set of illustrations of conference settings.

An important means to realize these objects is the definition of the concept of Operational Affinity. As opposed to Virtual Reality, which is a computer-simulated simplex vision of something that does not exist, visible to, usually, a single user, Operational Affinity means one single visual and audio affinity, including real-time duplex transmission of images and sound, everything that is operationally important to people who wish to communicate as undistorted as if they where on the same location, even though the operational affinity may comprise multiple physically distributed sites. To a conferee in operational affinity actual physical distance to fellow conferees is immaterial while the operational distance is a function of the respective conferees' positions, their respective conferee spaces and the distance to the visual interface. In order to address the problem of how to create a viable operational affinity, it is instrumental to contemplate a surface plane 10 without volume as cross section of a conference setting 400 in a studio 20 as illustrated in FIG. 2a. Conferees are sitting within conferee spaces 110 and 210 on each side of the surface plane 10. They cannot pass through the surface plane 10, but they can clearly see everything and everyone sitting beside them or opposite them. They can follow all body and eye movements, and they can establish eye contact with everyone in the conference setting 400. They can hear what people say and from where the sound is emanating. They may see walls, floor or ceiling on each side of the dividing surface and appreciate that the floor on the first side continues on the second side. The conference setting 400 may be a normal spacious corporate conference facility.

Figure 2B:
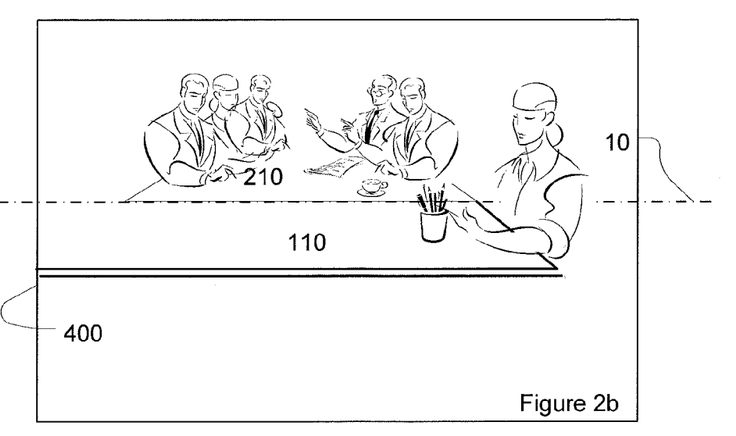
Figure 2C:
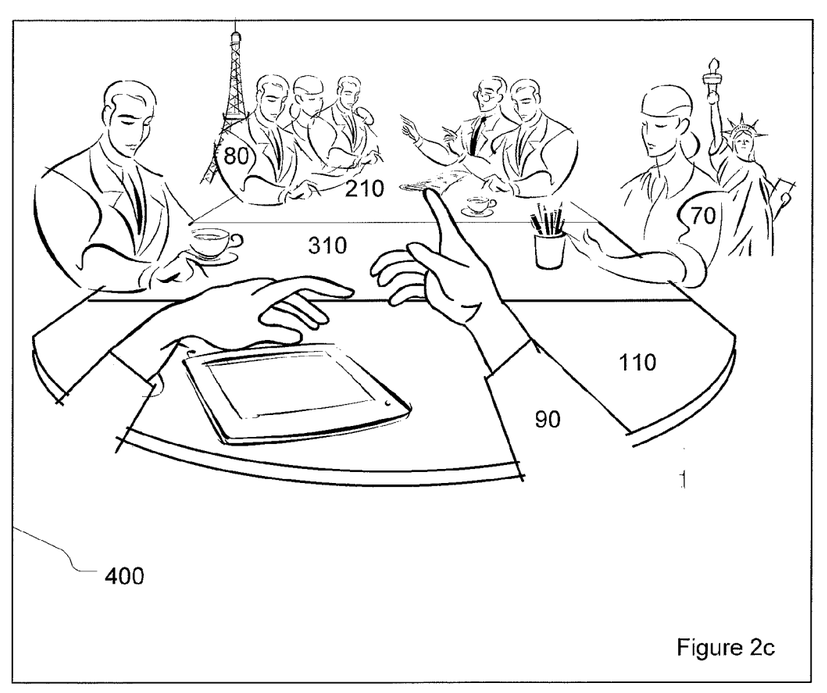

Now consider that the conferee space 210 on a first side of the surface 10 is actually not present in the local facility 20, but in a corresponding remote facility 200, and that the image of them, as they would have been seen from the local facility 20 is rendered through the cross section 10. Further consider a situation where the conferee space 110 on the second side is equally rendered in the other direction, from another remote studio 100. Under these circumstances operational affinity has been established among physically distributed locations so that one operational conference setting 400 is created . . . None of the conferees visible in the image according to FIG. 2b is actually present in the local facility 20. FIG. 2c shows how a conferee in a remote conferee space 110 can conferee 70 who is present in the facility 20 but also with a conferee 80 in another remote conferee space 210.

Neither of the documents referenced in the background accomplish operational affinity between two physically distributed sites. In fact, by implementing a backdrop solution, operational affinity is virtually disabled. Further, operational affinity has as prerequisite an interface that enables duplex (i.e. according to Collins English Dictionary, "permitting the transmission of simultaneous signals in both directions") image transmission. In other words, the transmission of images must be two-way, simultaneous, equivalent and uniform, such that it does no matter on which side of the interface a participant is located, the experience is equivalent on both physically distributed studio sites. The documents referenced above feature no such pair of studios, with identical features. On the contrary the figures that feature studio pairs, for example FIGS. 20-23 of WO 2008/036931 McDuffie are consequently not identical in design, but rather comprise "reflecting off the two-way mirror a backdrop to form a reflected backdrop, the reflected backdrop being superimposed with the image on the display when viewed from the observation zone".

WO 2009/120814 MacDonald fails to accomplish operational affinity for additional reasons. With reference to MacDonald FIG. 1 a, again: while a participant at the local desk may see three remote persons L, C, R on three respective screens 120L, C, R, the document does not provide a solution to how e.g. the person L is enabled to perceive the person C as sitting immediately to his own (L:s) left hand side. As a consequence, if a person in the local studio refers to an object as visible "in the centre screen", that reference only means something to the other people in the same room. It means nothing to either of remote persons L, C and R. Therefore operational affinity may not be accomplished based on the teachings of McDonald, alone or in combination with the teachings of McDuffie.

Embodiments of the present invention enable operational affinity, and thereby the above objectives are achieved, solving the many serious problems inherent in previously known teleconferencing systems. The solution to the problems associated with these objectives is non-intuitive in that it works contrary to established and well-documented views and opinions previously accounted for.

Figure 3A:
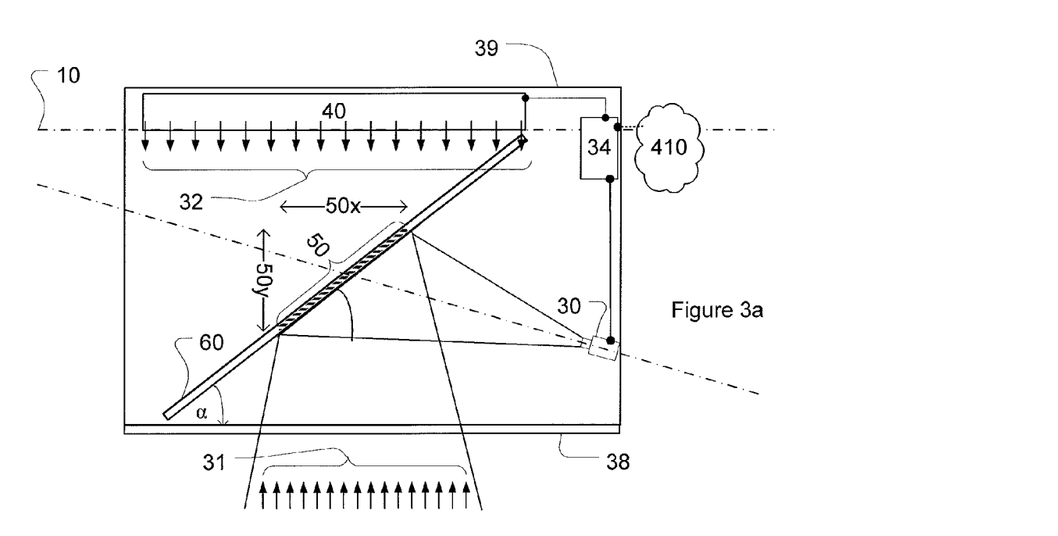
FIG. 3 is a schematic view of embodiments of a transceiver comprised in a studio.
Figure 3B:
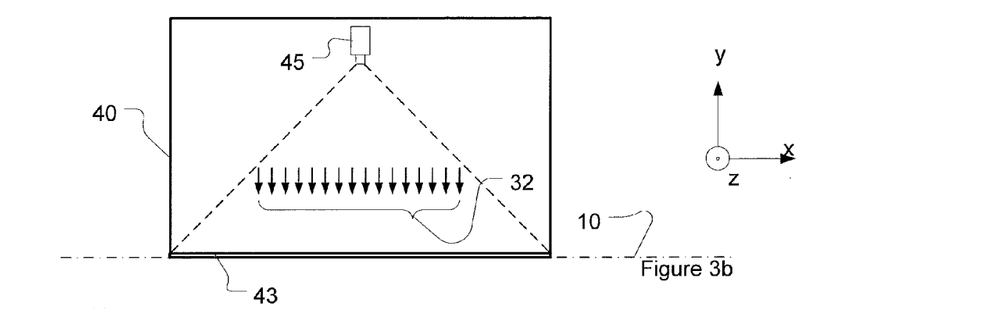

A transceiver 305 for life size conferencing comprised in embodiments of the present invention will now be described in relation to FIG. 3a. The transceiver 305 comprises an input unit 30 and an output unit 40 both connected to a networking unit 34. The networking unit 34 comprises a processing unit and a networking card, and is adapted and configured to receive from a communications network 410, such as e.g. the Internet or a telecom network, video signals comprising moving images, audio signals, as well as data such as e.g. powerpoint presentation and various media content. The transceiver 305 is adapted and configured to collect local still or moving images 31 and enable the images 31 to be rendered at a remote site. The transceiver 305 is also adapted and configured to receive remote still or moving images 32 from a remote site and render it on the display 40. The input unit 30 may be a camera, and the display output unit 40 comprises an image forming unit 45 and an image rendering surface 43, such as for instance a back projection screen 43 and a back projector 45 as showed in FIG. 3b. The output unit 40 may alternatively be an LCD unit or a plasma screen unit or some other appropriate image rendering device. The rendering surface 43 of the output unit 40 is arranged along an interface surface 10, so that the output unit 40 is contained between the interface 10 and the transceivers rear wall 39 parallel to the interface 10. The transceiver 305 front wall is a transparent barrier 38.

Diagonally through the transceiver 305, from the output unit 40 to the barrier 38, skewed with an angle α around a vertical axis z, runs a screen 60. The screen 60 may consist of film mounted on a frame. The film may be transparent. The film may be surface foiled polyester film with a very high transparency. Because the film may be made so thin, it is very light, and it does not cause ghost images as would thicker glass mirrors. The screen 60 may be treated so that the angle of refraction is different on each side, so that the surface facing the output unit 40 has a wide critical angle, and the surface partly facing the barrier 38 and partly the input unit 30 has a narrow critical angle. This has the advantage that it maximizes the transmission of the display 40 light, and at the same time maximizes the light transmitted in through the barrier 38, and which is then reflected into the input unit 30.

Figure 3C:
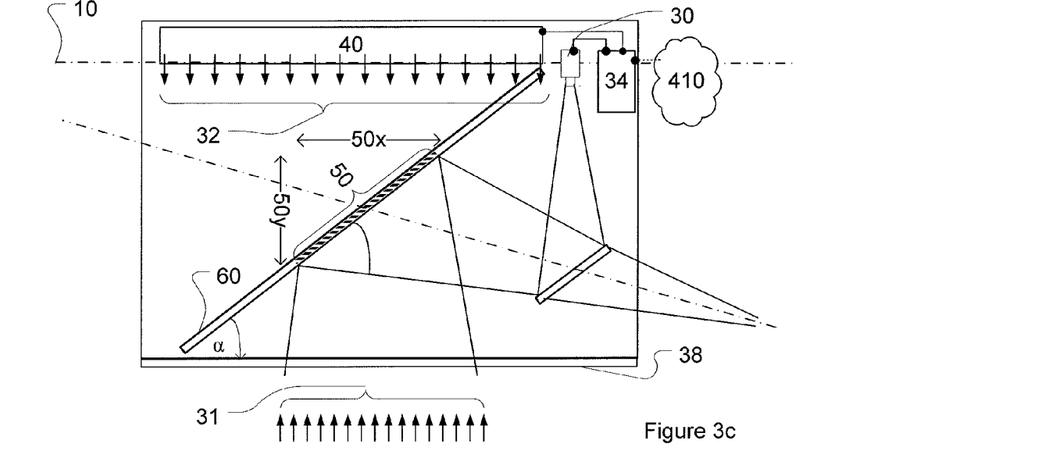

The input unit 30 and output unit 40 are adapted and configured to provide continuous duplex image transfer via a duplexer area 50 on the screen 60. The networking unit 34 provides received images 32 to the display 40 so that they can be rendered on the rendering surface 43. The rendered remote images 32 are visible through the completely transparent protective barrier 38. The barrier 38 may comprise an antireflection coated pane of e.g. glass. The barrier 38 is adapted so that the components comprised within the transceiver 305 are not accessible from the external environment. This is an advantage because it prevents conferees or staff from tampering with the insides of the transceiver 305. Components fixed, installed and configured according to a predetermined design will remain within the same distances, angles and aspects as intended. In the other direction, reflections from a local environment, i.e. local images 31, may pass through the barrier 38. The images 31 are then transmitted, i.e. reflected in the surface of the screen 60, due to total reflection. Note that a semi-transparent, i.e. semi-opaque, screen would not accomplish the desired duplex image transmission effect. Eventually the images 31 reach the aperture of the camera 30, which converts them to a format with may be transmitted electronically to the networking unit 34. In certain embodiments of the invention, the transceiver comprises a mirror as seen in FIG. 3c. These embodiments have at least two advantages. Firstly, the optical distance between the camera 30 and objects being imaged in the images 31 may be longer. This in turn makes the beam path straighter, more collimated, and thus the transceivers ability to contribute to a studio with true eye contact experience increases. A second advantage is that the images 31 arrive twice mirror-inverted, that is correct, to the camera 30.

For future reference, when referring to a transceiver as described above, that is in place in a studio such as the one described below, the most significant digit (MSD) of the studio reference will be concatenated to the reference number of the transceiver, or a component comprised in the transceiver as described above, so that studio and transceiver reference numbers share the same MSD.

As opposed to e.g. embodiments suggested by McNelley, the transceiver 305 is not emulating the presence of a remote conferee floating within a local conferee space. Instead, the transceiver 305 enables embodiments of the present invention to concatenate a local conferee space and a remote conferee space into one single operational conference setting 400, so that everything within the respective spaces, be it humans, furniture or wall paintings, is visible to a person anywhere in the operational conference setting 400, unless local line of sight is obstructed. The concatenation is a visual concatenation of a cross section of the first studio and a cross section of the second studio as described above. The cross section in each studio is placed with a margin from a dedicated conferee space. The studio cross section 10 may coincide with the display output unit surface. There are several subtle but crucial differences to prior art arrangements. For instance, as opposed to a concatenation of cross-sections, the teaching of McDonald advocates concatenation of displays side-by-side in a way that does not enable duplex image transmission between the sites imaged in those respective displays.

Figure 4:
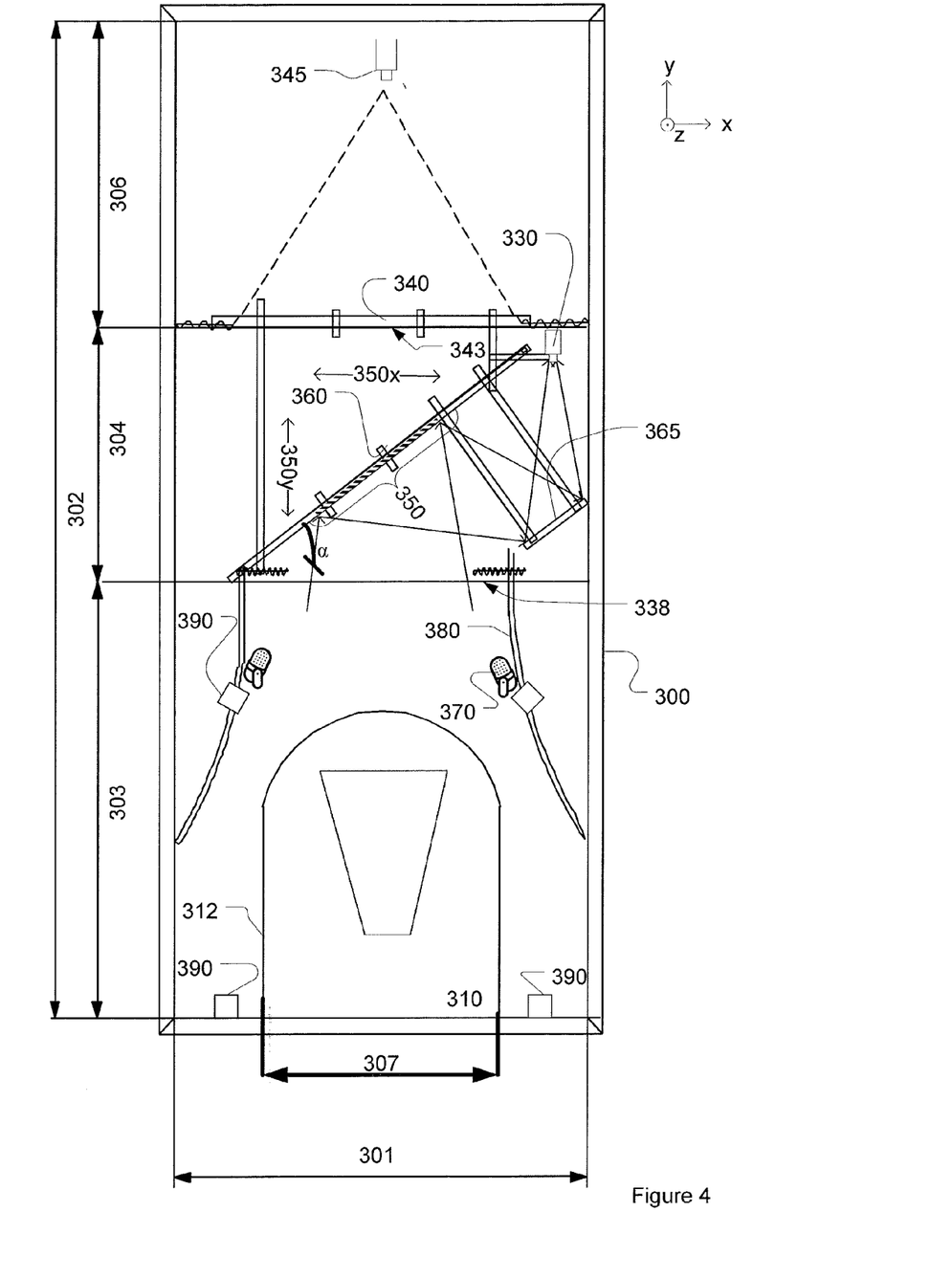
FIG. 4 is a view of an embodiment of a studio.

A studio 300 for life-size conferencing according to one embodiment of the present invention will now be described in relation to FIG. 4. The studio 300 is related to a Cartesian coordinate system, such that the x-axis denotes the lateral dimension, the y-axis denotes the depth dimension and the z-axis denotes the vertical dimension. Within the studio 300 a transceiver 305 is comprised, assembled so that the far wall of the transceiver 305 coincides or is adjacent to the far short side of the studio 300. A transceiver barrier 338 faces the inside of the studio. The transceiver 305 comprises a display 340 that may be adapted and configured to display high definition TV, with an aspect ratio of 16:9.

The transceiver is oriented such that a screen 360 comprised in the transceiver 305, the conferee space 310 and the display 340 are arranged so that their respective centers lie along a common depth-line. The screen 360 is skewed slightly with an angle $\alpha$ around a vertical axis z. The angle $\alpha$ may be 37 degrees, but will depend on among other things the distance to the conferee space 310. If $\alpha$ is too small the left-most part of the screen 360 will fall under the critical angle with respect to the conferees, and will thus reflect an image that interferes with the transmitted images 32 from the display 340. Further a visual feedback loop may occur on the right hand side of the screen 360, with an unwanted image-in-image-in-image. A camera 330 is placed and slanted so that its center of view impinges on the screen 360 under a some-45 degree angle. Thereby, a totally reflected image of the conferee space 310 and anything in it in line of sight, may be received by the camera 330. With an $\alpha$ less than 37 degrees it is increasingly hard to slant the camera in such a way as to get a straight image. A non-straight image will impair the user experience in terms of eye-contact etc. The part of the screen 360 which can be viewed by the camera 330 and through which a remote space may be seen constitutes a duplexer area 350. Because the screen 360 is skewed less than 45 degrees the x-component 350x of the duplex area 350 is wider than the y-component 350y. This gives a sort of optical gearing of the image width which does not distort the image as a wide-angle lens may have, and which further does not affect the sensitivity for lateral movements. Skewing of the screen 360 around a vertical axis enables a screen 360 large enough to render a full-size conference setting. Previously known systems have failed to exploit the fact that spacious physical conference settings are commonplace and plentiful in the corporate world. Although there is a theoretical space restraint, a screen of a size that fits an existing conference room is quite sufficient. The true limitation is the height of the doorway that gives access to the studio. Since the screen film arrives to the site mounted to a rigid frame it must pass through the doorway without deformation. A normal doorway height may be 205 cm. 350×180. Vertical skewing admits embodiments to utilize a cross section 10 with a 180 height. In comparison, a solution with a screen skewed around a horizontal axis would reduce the feasible operative height, and in order to maintain the fixed aspect ration, the width would have to be correspondingly reduced. Vertical skewing is therefore an important feature of studios according to the present invention, which gives it advantages over previously known systems.

Further, the larger the screen the more sensitive it will be to bulging in a horizontal axis skewing. These problems are not obvious in a solution emerged in a limited space context. Neither McDuffie nor McDonald discloses a screen skewed around an horizontal axis. Further, neither of them discloses a duplex area such that the duplex area width as seen from the local conferee space is wider than the duplex area width as seen from the input unit.

Previously known teleconferencing systems comprising components of a certain magnitude are without exception based on a principle where the camera can receive the image of the conferee through a screen, while a display on the side is reflected in the screen surface so that the conferee can see it.

The differences in placements of the camera have important implications. With the screen between the conferee space and the camera, the camera must be placed close to the screen; otherwise the camera image will also contain disturbing reflections from the screen surface. One upside of this is that studio space can be saved behind the screen. However, this limits the optical distance to the conferee space, and the shorter the optical distance, the more salient is the gaze parallax phenomenon. True operational affinity 400 as defined above cannot be accomplished with a camera behind the screen. It is not obvious unless you are prompted to imagine two cameras facing each other, with wide displays on each side, trying to accomplish operational affinity 400.

Placing the display 340 behind the screen 360 instead also allows for the screen 360 to be skewed substantially less than 45 degrees. This is an advantage as it reduces the margin mentioned above and therefore the apparent distance while the optical distance to the camera is not affected. According to one embodiment the screen is skewed 37 degrees, but it may also be skewed more or less.

Figure 6A:
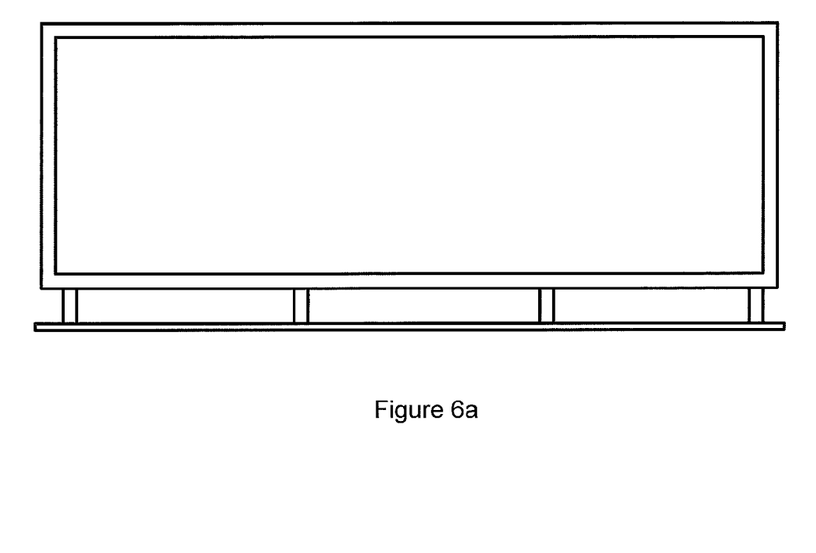
FIG. 6*a* is an example of a screen frame.

The screen 360 may consist of film mounted on a frame. The film may be surface foiled polyester film with a very high transparency. Because the film may be made so thin, it is very light, and it does not cause ghost images as would thicker glass mirrors. The film is also virtually unbreakable. Mounting of the film on a sturdy aluminum frame as disclosed in FIG. 6a enables a screen size equal to a full size conference studio wall. This size is instrumental in creating a single operational conference setting. The film may be treated so that the angle of refraction is different on each side, so that the surface facing the display has a very narrow critical angle, and the surface facing the conferee space 310 has a wide critical angle. This has the advantage that it maximizes the transmission of the display light, and at the same time maximizes the light reflected into the camera 330.

A relatively long optical distance between the conferee space 310 and the camera 330 is an advantage, as the optical distance is relative to the duplexer area 350 and inversely proportional to the experienced gaze parallax. A relatively long optical distance has the further advantage that it limits transmission losses in the reflected image—the more parallel beam paths impinging on the screen 360, the narrower the refraction angle, and the bigger the margin to the critical angle. According to one embodiment, the camera 330 may be placed at a distance of 350 cm from the center of the screen 360. A short optical distance may be compensated by a camera 330 with a wide-angle rectilinear lens, with barrel and pincushion distortion reduction. According to one embodiment, the optical distance can be extended by using additional mirrors. This embodiment has the additional advantage that the image arrives twice mirror-inverted, i.e. ready for rendering. In other embodiments, this second mirror function is emulated by software for instance in the camera 330. The closest part of the conferee space 310 may be placed at the hyperfocal optical distance from the camera lens. Therefore, the depth of field comprises the entire conferee space 310, and well beyond. In other words, anyone or anything comprised in the dedicated conferee space 310, or beyond, will be in focus of the camera 330. The camera wide-angle lens also reduces the hyperfocal distance, and because of this, it is entirely possible to contain the camera 330 within a studio of normal dimensions.

The studio 300 may comprise an audio system 370 comprising microphones. The microphones may be body mikes, placed on each conferee. The microphones may also be studio microphones placed in strategic locations, such as e.g. along a lateral axis in front of the conferee space. The audio system may further comprise means to transfer information regarding relative location of the sound source. Further the audio system comprises sound modifying curved wall segments 380 on each side of the conferee space 310. Other surfaces of the studio 300 may also be covered with acoustic material in order to reduce unwanted reverb that would otherwise distort the transmitted sound profile.

Figure 6B:
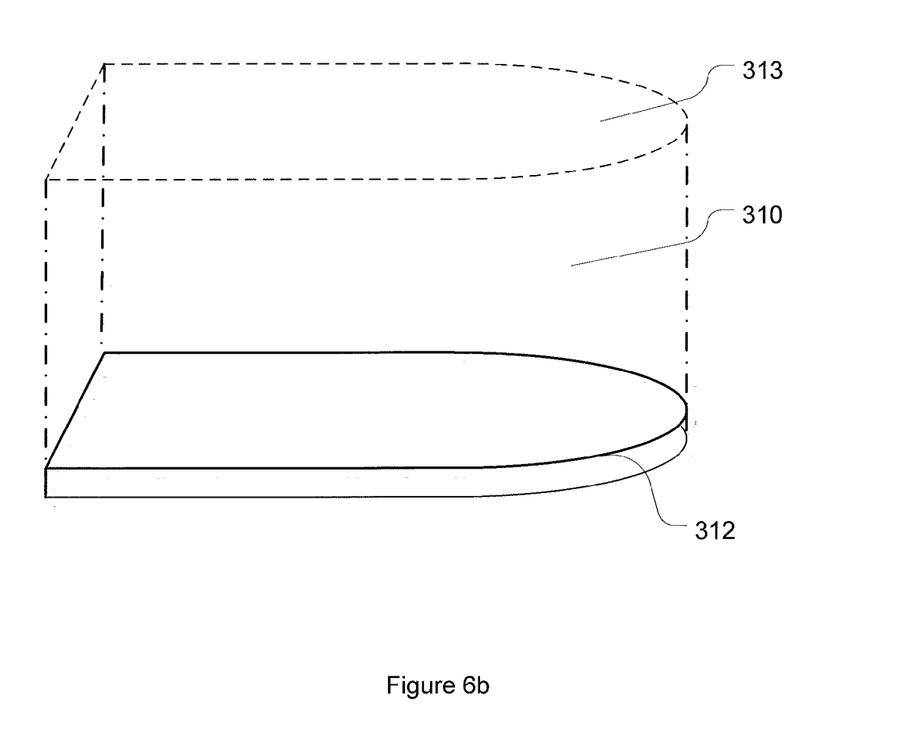
FIG. 6*b* is an illustration of a conferee space comprised in a studio.

In order to mitigate the intensity reductions that may occur in the screen 360 during transmission and reflection, diffuse light sources 390 of neutral white light are distributed evenly around the conferee space 310, for instance in the walls, ceiling, floor etc. They may be integrated into the acoustic segments. In order to avoid conferees accidentally ending up outside the designated conferee space 310, markings 312 on the floor may indicate to conferees where they may stand, see and be visible and the same time. In certain embodiments the designated conferee space 310 is confined to a space above a slightly elevated platform 312 or dais as illustrated in FIG. 6b. The dais provides the additional advantages of facilitating efficient lighting, and of positioning the conferee space 310 in the vertical centre of the screen 360, which by design may be elevated slightly from the floor, e.g. because of the supporting frame.

In one embodiment of the present invention the width 301 of the studio is 4000 mm, the total length 302 is 9760 mm, the section 303 is 4280 mm, the section 304 is 2480 and the section 306 is 3000 mm. The elevated platform may have a width 307 of 3000 mm. A table placed on the platform may have a symmetric isosceles trapezium top. That way, the conferees' viewability is increased, which is an advantage.

The studio 300 may further comprise a second transceiver, identical to the first transceiver, to a second remote studio, the second interface adapted and configured to visualize a second image of the entire second remote conferee space visualized to scale, without aberrations, the images and the local studio concatenated to an operational conference setting 400, thereby enabling a conferee located anywhere in the local space to establish eye contact with a conferee visible in the image of the second remote space. The interfaces may be located on opposite sides of the conferee space.

Figure 5:
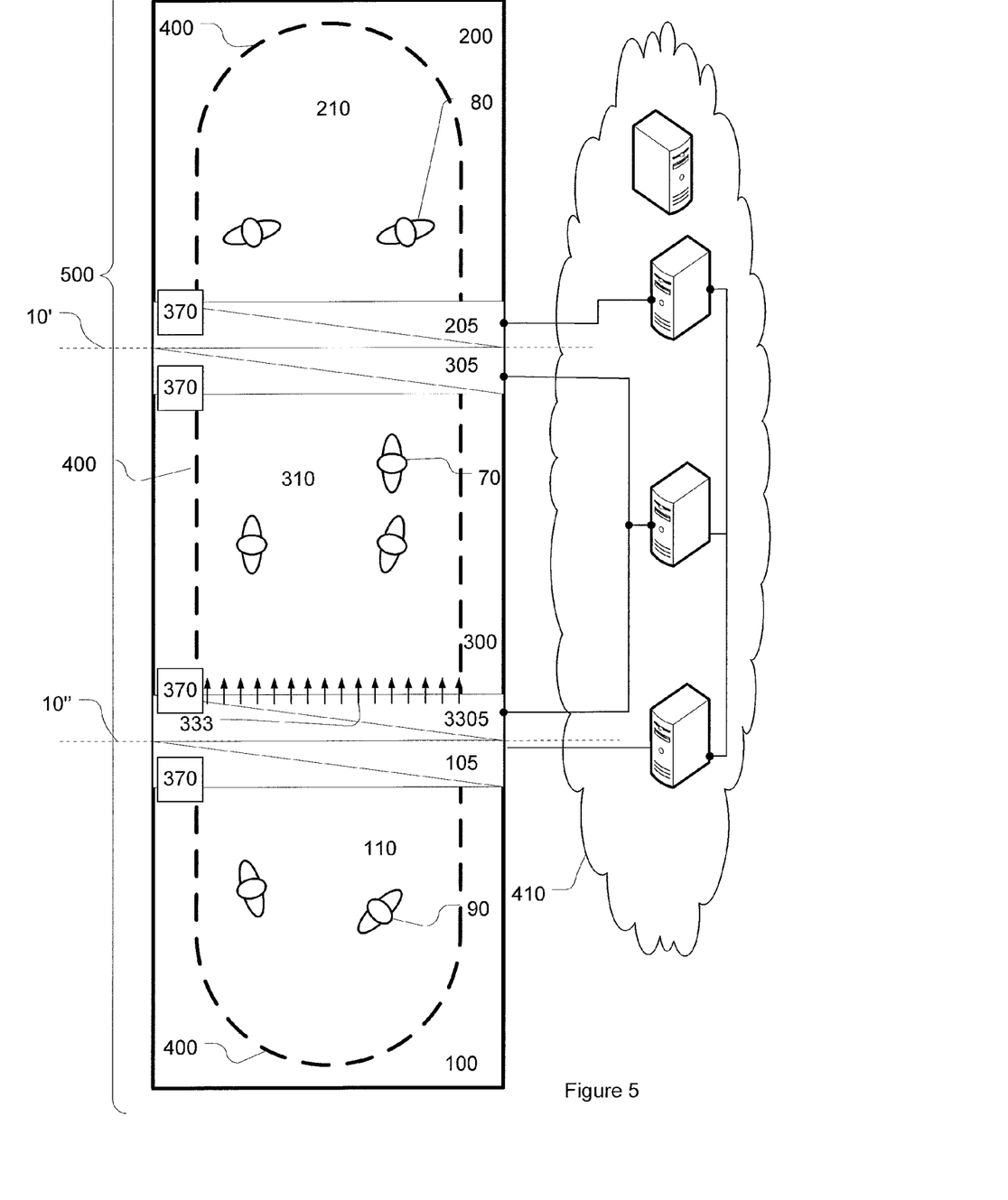
FIG. 5 is view of a communication system.

An operational conference setting 400 system 500 will now be described in relation to FIG. 5. The system comprises a first and a second studio which may be connected via a telecommunication system that enables real-time transmission of conference information comprising images and sound. The two studios may be calibrated such that an image of the entire second conferee space is visualized to scale, without aberrations, concatenated to the first conferee space, and the other way around, i.e. in duplex . . . The system may comprise an audio system comprising microphones. The second studio may comprise two local transceivers to remote studios, and the system may further comprise a third studio, The second and the third studio may be calibrated such that an image of the entire first and the entire second conferee space is visualized to scale, without aberrations, concatenated to the third conferee space, and the other way around, in full duplex.

Figure 7:
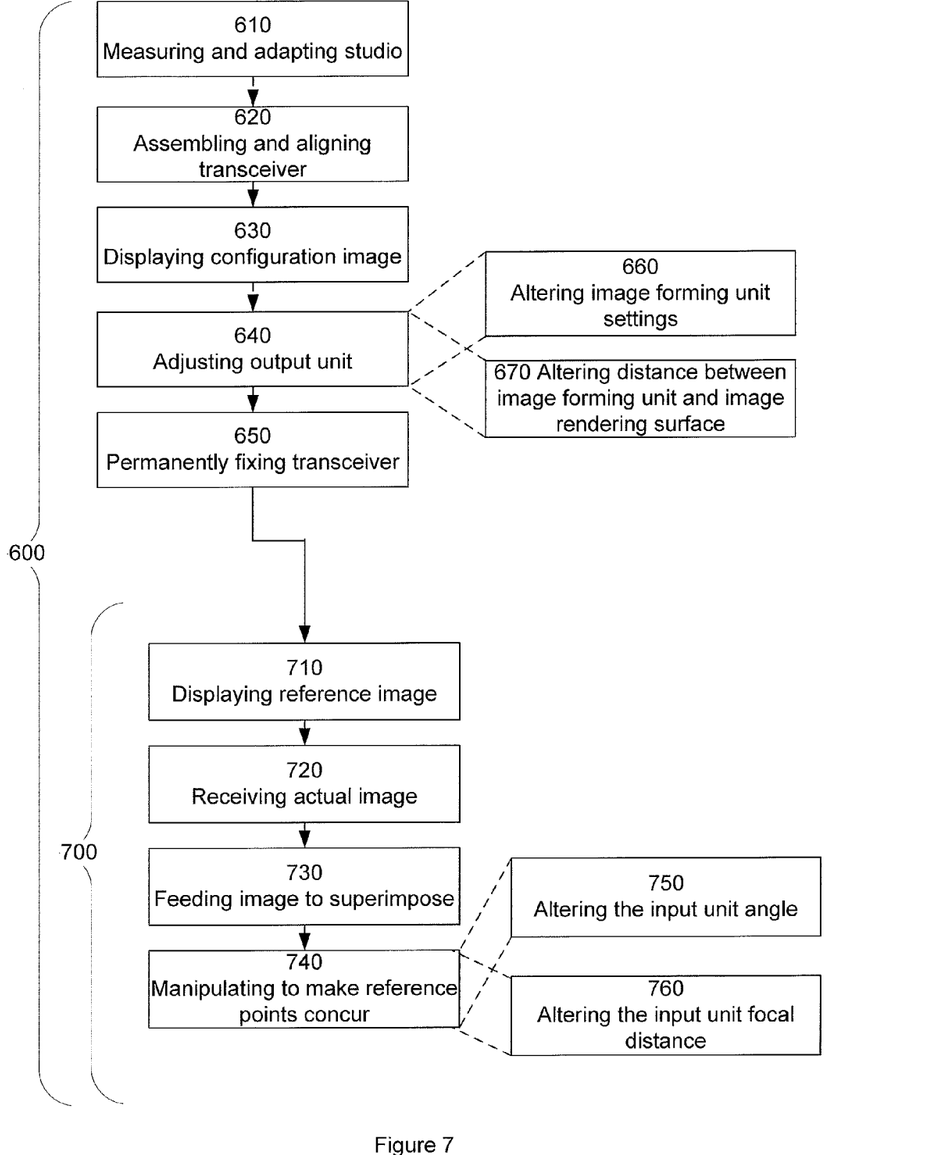
FIG. 7 is a flowchart over embodiments of a configuration method and a calibration method.

A configuration and calibration method 600 for a studio enables transmission of accurately calibrated conference information to a remote calibrated studio. The method further enables reception and accurate rendering of received conference information from a remote studio. The method 600 is performed at commissioning of the studio. The accommodation intended to become a studio is measured and adapted so that the physical inner dimensions comply with standardized dimensions in terms of width 301, depth 301 and height, and construction of platform 312 or markings as applicable. A transceiver 305 is then assembled according to a standardized design so that all distances and aspects are identical, both internally within the transceiver as well as relative the studio interior. A reference configuration image is displayed on the display 340, and the displayed image is then measured. Thereafter the configuration image, as it is displayed on the display 340 is adjusted so that it takes the right proportions. In embodiments comprising a projector 345, the adjustment may be achieved through manipulation of the distance and relation between the display screen 45 and the projector 43. The input unit 330, output unit 343, 345, screen 360 and duplexing area 350 are always permanently attached, anchored directly or indirectly to each other. Indirect attachment means that a component is braced to wall, floor or ceiling with non resilient fixtures such as metal bar fittings. Direct attachment may also be made with metal bars or other non-resilient fixtures.

Once the input unit 330, output unit 340 and screen 360 have been fixed in their respective standardized positions, a calibration method 700 is performed. The method 700 comprises the following sub steps:

The display 340 is displaying a reference calibration image. The reference calibration image is featuring a standardized studio comprising a conferee space, as seen by a perfectly configured camera. The reference image comprises a set of reference points. The previously mentioned configuration image may be identical to the calibration image. The camera 330 is receiving an image of the actual studio 300 via the duplexer area 350 of the screen 360.

The image of the actual studio 200 from the camera 330 is fed back to the display 340, in such a way that the two images and thereby their respective sets of reference points are superimposed. An image mixer may be used for this.

If the two sets of reference points do not coincide, the camera 330 is adjusted. The angle and/or the focal distance of the camera 330 may be manipulated in order to obtain perfect agreement between the superimposed images.

If a remote studio 200 loses its calibration after commissioning during which the method 600 has been performed, the calibration method 700 may be performed remote on the studio 200 via a network 410 such as a telecommunication system or the Internet, in the following way:

The display 340 is displaying a reference calibration image. The reference calibration image is featuring a standardized studio comprising a conferee space, as seen by a perfectly configured camera. The reference image comprises a set of reference points. A remote networking unit 234 of the remote studio 200 sends an image of the remote studio 200 as seen by the remote camera 230. The image is received over the network 410 by the networking unit 334 in the local studio 300.

The image of the remote studio 200 is fed to the display 340, in such a way that the two images and thereby their respective sets of reference points are superimposed. An image mixer may be used for this.

If the two sets of reference points do not coincide, the camera 230 is adjusted. The angle and/or the focal distance of the camera 330 may be manipulated in order to obtain perfect agreement between the superimposed images. The adjustment can be made by a person present in the remote studio 200 who receives instructions from the local studio 300. The adjustments can also be made by an electronic unit that is configured and adapted to receive control signals from the local studio and adjust camera angle and camera focal distance according to the received control signals.

The lightning in the studio is also standardized. A photometer is used to make sure that the right lighting is achieved. In a studio according to one embodiment of the invention ten different spots are measured with a photometer. The colors of the camera and the projector are tuned with the help of a Pantone-meter. The depth of field and other settings are also standardized.

The combination of dimensions, hyperfocus, calibration and life-size rendering enables a first conferee located anywhere in the first space to establish eye contact with a second conferee located anywhere in the second space. If further enables a conferee to determine when there is no true eye contact. Because the whole conferee space lies in hyperfocus, it is further possible to connect several studios in series, as disclosed in FIG. 4. This embodiment requires at least three studios, one of which has at least two studio interfaces.

As opposed to previously known teleconferencing solutions, the present invention aims to create one single conference setting 400 with operational affinity from one local 300 and multiple remote studios 100:200. The key to success is the ability to "mirror the mirror" or in other words to successfully concatenate two remote conferee spaces 110:210 into one conference setting 400 with operational affinity. Therefore, rather than imaging a person or an object at a certain distance, an entire space must be imaged realistically in order to attain the desired technical effect. Further in order to truly accomplish one conference setting 400, all participating studios must be identical and correctly calibrated. Therefore mounting of the studio interior constitutes one important aspect of the present invention. As mentioned previously, there is some degree of freedom in how to design a studio in terms of placement of the components of the transceiver, that is the output unit 340 comprising rendering surface 343 and image forming unit 345, input unit 330, screen 360 and duplexing area 350. However, within any given system according to the present invention, these components must always be placed according to the same identical design, so that all distances and aspects are identical. Therefore the components of the transceiver are always permanently attached, anchored directly or indirectly to each other. Indirect attachment means that a component is braced to wall, floor or ceiling with bars or rods which may be of metal.

Experiments with embodiments of studios, systems and calibration methods according to the present invention have shown that people experience videoconferencing as almost as good as conferencing in real life. Testimonials quote an 80% to 90% performance relative real-life conferencing, and relates this to a 50% performance experienced during existing camera-in-screen teleconferencing methods. Both the visual and the sound experiences are improved. Embodiments according to the present invention are compatible with all standard input and output systems from all vendors, such as a camera-display system, and therefore offer the great advantage of preventing locking-in mechanisms. Existing solutions rely on a certain input-output system, and in order to migrate to other input-output systems, several components of the teleconferencing system must be converted, ad a cost both in time, money and performance.

Embodiments of the present invention are moreover fully 3D compatible. The input unit may for instance be a time-of-flight camera, a stereo camera etc., and the output unit may be a 3D or stereo rendering output.

The invention claimed is:

1. A studio for life-size videoconferencing comprising a local conferee space and a local transceiver comprising an optical input unit, an optical output unit, a screen and a transparent protective barrier, wherein said transparent protective barrier is provided to seal and protect the components of the transceiver from being accessed from the local conferee space and said screen is provided between the transparent protective barrier and the optical output unit skewed with an angle ($\alpha$) around a vertical axis (z), such that the screen totally reflects an image of the complete local conferee space, enabling the image of the entire local conferee space to be visualized to scale, without aberrations, in a remote conferee space and is transparent for a conferee in the local conferee space that is observing the optical output unit showing an image of the remote conferee space visualized to scale without aberrations, thereby enabling a local party comprising a conferee to establish eye contact and register the body movements of a remote party comprising conferee.

2. The studio according to claim 1, where the screen comprises a duplex area, wherein said screen is skewed with an angle (α) such that the duplex area width (50*x*) as seen from the local conferee space is wider than the duplex area width (50*y*) as seen from the input unit.

3. The studio according to claim 1, wherein the angel (α) is in the range of 37-45°.

4. The studio according to claim 1, in which the transceiver comprises a mirror arranged to reflect the image from the screen to the input unit via the mirror in such a way that the optical distance between the local conferee space and the input unit is extended.

5. The studio according to claim 2, in which the duplex area comprises the portion of the screen being in field of view of the optical input unit and through which the optical output unit may be visible from the conferee space.

6. The studio according to claim 1, where the conferee space is a designated conferee space confined to a space above a slightly elevated platform.

7. The studio according to claim 1, in which the screen comprises a surface foiled polyester film mounted on a frame.

8. The studio according to claim 7, wherein the surface foiled polyester film has a wide critical angle of refraction for the surface facing the conferee space and a narrow critical angle of refraction for the surface facing the optical output unit.

9. The studio according to claim 2, further comprising a second local transceiver to a second remote studio, enabling the image of the entire local conferee space to be visualized to scale, without aberrations, to a second remote conferee space; the second remote conferee space is operationally concatenated via a second duplexer area to a conference setting, thereby enabling a local conferee within the conference setting to establish eye contact and register the body movements of a remote conferee within the same conference setting, regardless of the remote conferees' physical location.

10. A conference system, comprising at least two studios according to claim 1, and a telecommunication system connectable to each studio enabling real-time transmission of conference information comprising images and sound, wherein the studios are possible to calibrate such that an image of a first conferee space is transmitted and visualized to scale without aberrations to a second conferee space, and such that an image of the second conferee space is transmitted and visualized to scale without aberrations to the first conferee space; the conferee spaces being operationally concatenated via transceiver duplexer areas, audio systems and lighting systems to a single conference setting, thereby enabling a conferee within the conference setting to establish eye contact, register the body movements, listen and speak to a remote conferee within the same conference setting.

11. The system according to claim 10, comprising three studios, wherein the system enabling visual concatenation of three conferee spaces into one operational conference setting, thereby rendering a conferee in the second space visible to a conferee in the third space via the image of the first space.

\* \* \* \* \*